United States Patent
Sanne et al.

(10) Patent No.: US 10,450,197 B2
(45) Date of Patent: Oct. 22, 2019

(54) SILICA SOL

(71) Applicant: Akzo Nobel Chemicals International B.V., Arnhem (NL)

(72) Inventors: Erik Sanne, Mölndal (SE); Freddie Hansson, Kungälv (SE)

(73) Assignee: Akzo Nobel Chemicals International B.V., Arnhem (NL)

( * ) Notice: Subject to any disclaimer, the term of this patent is extended or adjusted under 35 U.S.C. 154(b) by 0 days.

(21) Appl. No.: 15/688,355

(22) Filed: Aug. 28, 2017

(65) Prior Publication Data

US 2017/0355606 A1 Dec. 14, 2017

Related U.S. Application Data

(62) Division of application No. 14/910,330, filed as application No. PCT/EP2014/067695 on Aug. 20, 2014, now Pat. No. 9,771,271.

(30) Foreign Application Priority Data

Aug. 23, 2013 (EP) .................................... 13181479
Oct. 15, 2013 (EP) .................................... 13188730

(51) Int. Cl.
| | |
|---|---|
| D21H 21/10 | (2006.01) |
| C01B 33/143 | (2006.01) |
| C01B 33/141 | (2006.01) |
| C01B 33/142 | (2006.01) |
| C01B 33/145 | (2006.01) |
| D21H 17/37 | (2006.01) |
| D21H 17/68 | (2006.01) |
| D21H 19/40 | (2006.01) |
| C01B 33/14 | (2006.01) |

(52) U.S. Cl.
CPC ............ *C01B 33/143* (2013.01); *C01B 33/14* (2013.01); *C01B 33/141* (2013.01); *C01B 33/142* (2013.01); *C01B 33/145* (2013.01); *D21H 17/375* (2013.01); *D21H 17/68* (2013.01); *D21H 19/40* (2013.01); *D21H 21/10* (2013.01)

(58) Field of Classification Search
CPC ... C01B 33/141; C01B 33/142; C01B 33/143; C01B 33/145; D21H 17/375; D21H 21/10
USPC ............................................ 162/164.6, 181.4
See application file for complete search history.

(56) References Cited

U.S. PATENT DOCUMENTS

| | | | |
|---|---|---|---|
| 4,388,150 A | 6/1983 | Sunden et al. |
| 4,961,825 A | 10/1990 | Andersson et al. |
| 4,980,025 A | 12/1990 | Andersson et al. |
| 5,127,994 A | 7/1992 | Johansson |
| 5,176,891 A | 1/1993 | Rushmere |
| 5,368,833 A | 11/1994 | Johansson et al. |
| 5,447,604 A | 9/1995 | Johansson et al. |
| 5,603,803 A | 2/1997 | Raak |
| 5,603,805 A | 2/1997 | Andersson et al. |
| 6,372,806 B1 | 4/2002 | Keiser et al. |
| 6,486,216 B1 | 11/2002 | Keiser et al. |
| 6,632,489 B1 | 10/2003 | Watanabe et al. |
| 6,951,638 B1 | 10/2005 | Burgfels et al. |
| 7,048,859 B1 | 5/2006 | Moffett |

(Continued)

FOREIGN PATENT DOCUMENTS

| | | |
|---|---|---|
| EP | 0335195 A2 | 10/1989 |
| EP | 1619171 A2 | 1/2006 |
| WO | 95/23021 A1 | 8/1995 |

(Continued)

OTHER PUBLICATIONS

European Search Report for EP 13181479.0, dated Dec. 20, 2013.

(Continued)

*Primary Examiner* — Mark Halpern
(74) *Attorney, Agent, or Firm* — McDonnell Boehnen Hulbert & Berghoff LLP

(57) ABSTRACT

The present invention relates to a silica sol having a pH above about 10, molar ratio of $SiO_2:M_2O$, in which M is alkali metal, of from about 6:1 to about 16:1, concentration of soluble silica above about 3000 mg $SiO_2/l$, and S-value of from about 18 to about 40%. The invention further relates to a process for producing a silica sol which comprises acidifying an aqueous alkali metal silicate solution to a pH of from 1 to 4 to form an acid sol, alkalizing the acid sol by addition of aqueous alkali metal silicate solution to obtain an intermediate sol and interrupt the addition of aqueous alkali metal silicate solution when the intermediate sol has reached a pH of from about 5 to about 8, stirring the intermediate sol for a time period of from about 10 to about 6000 seconds without addition of aqueous alkali metal silicate solution, alkalizing the intermediate sol by addition of aqueous alkali metal silicate solution to obtain a silica sol having a pH above about 10 and molar ratio of $SiO_2:M_2O$, in which M is alkali metal, of from about 6:1 to about 16:1, and optionally adding an aluminum compound to the acid sol, intermediate sol or silica sol. The invention further relates to a silica sol obtainable by the process of the invention. The invention further relates to the use of the silica sol as a flocculating agent, in water purification and in producing paper and board. The invention further relates to a process for producing paper and board which comprises: (i) providing an aqueous suspension comprising cellulosic fibers; (ii) adding to the suspension one or more drainage and retention aids comprising the silica sol; and (iii) dewatering the obtained suspension to provide a sheet or web of paper or board.

18 Claims, No Drawings

(56) References Cited

U.S. PATENT DOCUMENTS

2005/0020699 A1    1/2005   Isobe et al.
2005/0228057 A1   10/2005   Nvander et al.

FOREIGN PATENT DOCUMENTS

| WO | 98/30753 A1 | 7/1998 |
| --- | --- | --- |
| WO | 98/56715 A1 | 12/1998 |
| WO | 00/66491 A1 | 11/2000 |
| WO | 00/66492 A1 | 11/2000 |
| WO | 00/75074 A1 | 12/2000 |
| WO | 01/46072 A1 | 6/2001 |
| WO | 05/097678 A1 | 10/2005 |
| WO | 05/100241 A1 | 10/2005 |
| WO | 08/150230 A1 | 12/2008 |
| WO | 10/006994 A1 | 1/2010 |
| WO | 10/108211 A1 | 9/2010 |

OTHER PUBLICATIONS

International Search Report and Written Opinion for PCT/EP2014/067695, dated Oct. 29, 2014.
Iler et al., "Degree of Hydration of Particles of Colloidal Silica in Aqueous Solution", J. Am. Chem. 60 (1956), 955-957.
Sears, "Determination of Specific Surface Area of Colloidal Silica by Titration with Sodium Hydroxide", Analytical Chemistry, vol. 28, No. 12, 1956, 1981-1983.
Mullin et al., "The Colorimetric Determination of Silicate With Special Reference to Sea and Natural Waters", Analytical Chemistry ACTA, vol. 12 (1955), 162-176.

SILICA SOL

This application is a division of U.S. application Ser. No. 14/910,330, filed Feb. 5, 2016, which is the US national phase under 35 U.S.C. § 371 of international application PCT/EP2014/067695, filed Aug. 20, 2014, which claims priority to European application 13188730.9, filed Oct. 15, 2013, and European application 13181479.0, filed Aug. 23, 2013. The contents of U.S. application Ser. No. 14/910,330 are hereby incorporated by reference in their entirety.

FIELD OF THE INVENTION

The present invention relates to a silica sol and its production and use. The invention provides a silica sol which is suitable for use as a flocculating agent, in particular as a drainage and retention aid in papermaking.

BACKGROUND OF THE INVENTION

In the papermaking art, an aqueous suspension containing cellulosic fibers, and optional filler and additives, is fed into a headbox which ejects the cellulosic suspension onto a forming wire. Water is drained from the cellulosic suspension to provide a wet paper web which is further dewatered and dried in the drying section of the paper machine. Drainage and retention aids are conventionally introduced in the cellulosic suspension to facilitate drainage and increase adsorption of fine particles onto the cellulosic fibers so that they are retained with the fibers.

Silica sols are widely used as drainage and retention aids, usually in combination with charged organic polymers. Such additive systems are among the most efficient now in use in the papermaking industry. Examples of silica sols known in the art include those disclosed in U.S. Pat. Nos. 4,388,150 and 6,372,806 as well as International Patent Appl'n Publ. Nos. WO 91/07350, 91/07351, 94/05596, 98/30753, 98/56715, 00/66491, 00/66492, 2005/097678, 2005/100241, 2008/150230 and 2010/006994.

It would be desirable to provide a silica sol with improved drainage and retention performance in the production of paper and board. It would also be desirable to provide a method for producing such a silica sol. It would also be desirable to provide a process for making paper and board with improved drainage and retention performance.

SUMMARY OF THE INVENTION

The present invention is generally directed to a silica sol having a pH above about 10, molar ratio of $SiO_2:M_2O$, in which M is alkali metal, of from about 6 to about 16, concentration of soluble silica above about 3000 mg $SiO_2$/l, and S-value of from about 18 to about 40%.

The invention is further directed to a process for the production of a silica sol which comprises:
(a) acidifying an aqueous alkali metal silicate solution to a pH of from 1 to 4 to form an acid sol,
(b) alkalizing the acid sol by addition of aqueous alkali metal silicate solution to obtain an intermediate sol and interrupt the addition of aqueous alkali metal silicate solution when the intermediate sol has reached a pH of from about 5 to about 8,
(c) stirring the intermediate sol for a time period of from about 10 to about 6000 seconds without addition of aqueous alkali metal silicate solution,
(d) alkalizing the intermediate sol by addition of aqueous alkali metal silicate solution to obtain a silica sol having a pH above about 10 and molar ratio of $SiO_2:M_2O$, in which M is alkali metal, of from about 6:1 to about 16:1, and
(e) optionally adding an aluminum compound to the acid sol, intermediate sol or silica sol.

The invention is also directed to a silica sol obtainable by the process of the invention.

The invention is further directed to the use of the silica sol of the invention as a flocculating agent, both in water purification and as a drainage and retention aid in the production of paper and board.

The invention is further generally directed to a process for producing paper and board which comprises:
(i) providing an aqueous suspension comprising cellulosic fibers;
(ii) adding to the suspension one or more drainage and retention aids comprising a silica sol of the invention; and
(iii) dewatering the obtained suspension to provide a sheet or web of paper or board.

DETAILED DESCRIPTION OF THE INVENTION

In accordance with the present invention there is provided a silica sol, herein also referred to as the "sol", "sol of silica particles", or "sol containing silica particles", which is suitable for use as a flocculating agent, e.g. in papermaking and water purification, in particular as a drainage and retention aid in papermaking. The term "drainage and retention aid", as used herein, refers to one or more additives which, when added to an aqueous cellulosic suspension, give better drainage and/or retention than what is obtained when not adding the said one or more additives.

The silica sol of the invention provides several improvements when used as an additive in the production of paper and board, in particular when producing paper and board from cellulosic suspensions having low conductivity and/or cationic demand. Such cellulosic suspensions are commonly used in the production of paper and board from chemical pulp and recycled fiber pulp, e.g. in non-integrated paper and board mills and mills using a substantial amount of recycled fiber. The use of the silica sol according to the invention makes it possible to increase drainage (dewatering) and retention, decrease the steam consumption in the drying section and/or increase the speed of the paper and board making machine, to use a lower dosage of additive to give a corresponding drainage and retention effect, and improve paper and board formation, thereby leading to improved paper and board making processes, improved quality of the paper and board produced, and economic benefits. The silica sol of the invention also exhibits improved stability, in particular when being diluted with water, and improved stability towards precipitation, aggregation and gelation. Hereby the present invention provides benefits in terms of application and use of the silica sol.

Preferably, the sol according to the invention is aqueous. The sol contains silica particles, i.e. particles of or based on silica or $SiO_2$, which are preferably anionic and preferably colloidal, i.e., in the colloidal range of particle size. Aqueous dispersions of this type are usually referred to as sols. Preferably, the silica particles have been prepared by condensation polymerisation of siliceous compounds, e.g. silicic acids and silicates. Other elements or components may also be present in the aqueous phase of the sol and/or in the silica particles. Such elements or components may be present as impurities or as a result of deliberate introduction or modification.

The silica sol of to the invention has a pH of at least about 10.0, or at least about 10.2 and usually at least about 10.5. Usually, the pH of the silica sol is up to about 11.5, more often up to about 11.3 and often around about 11.0

The silica sol of the invention has a molar ratio of $SiO_2:M_2O$, in which M is alkali metal, of at least about 6:1, suitably from at least about 8:1, preferably at least about 10:1. The molar ratio of $SiO_2:M_2O$ is usually up to 16:1, suitably up to about 15:1 or up to about 14:1. The alkali metal M can be lithium, sodium, potassium and a mixture thereof, preferably sodium, and the molar ratios defined above are preferably the molar ratio of $SiO_2:Na_2O$.

The silica sol of the invention has a concentration of soluble silica of at least about 3,000 mg $SiO_2$ per liter of liquid sol (mg $SiO_2$/l), usually at least about 3,500 mg $SiO_2$/l or at least about 4,000 mg $SiO_2$/l. The concentration of soluble silica may be up to about 12,000 mg $SiO_2$/l, usually up to about 10,000 mg $SiO_2$/l or up to about 8,000 mg $SiO_2$/l, suitably up to about 6,000 mg $SiO_2$/l. The silica sol is preferably aqueous, and the above values are preferably per liter of aqueous sol (mg $SiO_2$/l). The concentration of soluble silica is measured and calculated as described by J. B. Mullin and J. P. Riley in Anal. Chim. Acta, vol. 12 (1955), pp. 162-176 using a UV-VIS Spectrophotometer Helios Alfa, Unicam The silica sol of the invention usually has a conductivity of at least about 3.0 mS/cm or at least about 4.0 mS/cm, suitably at least about 5.0 or at least about 6.0 mS/cm, preferably at least about 7.0 mS/cm. Usually, the conductivity is up to about 12.0 mS/cm, suitably up to about 10.0 mS/cm. The conductivity can be measured by means of known technique, e.g. using a Conductivity Meter CDM92, Radiometer, Copenhagen.

The silica sol of the invention usually has an S-value of at least about 18% or at least about 20%, suitably at least about 26% or at least about 30%. Usually, the S-value is up to about 40% or up to about 38% and suitably up to about 35%. The S-value is measured and calculated as described by R. K. Iler & R. L Dalton in J. Phys. Chem. 60(1956), 955-957. The S-value of a silica sol indicates the degree of aggregate or microgel formation and a lower S-value indicates a higher degree of aggregate or microgel formation.

The silica sol of the invention may comprise aluminum, and the silica sol may be modified with aluminum. The aluminum may be present in the continuous, or aqueous, phase of the sol and/or in the silica particles. Suitably, the silica sol contains silica particles which are modified with aluminum, and preferably the silica particles are surface-modified with aluminum. If the silica sol comprises aluminum, and if the sol and/or the silica particles are modified with aluminum as defined above, the silica sol usually has a molar ratio of Si:Al of at least about 4:1 or at least about 25:1, suitably at least about 50:1, preferably at least 75:1, and the molar ratio of Si:Al may be up to about 400:1 usually up to about 250:1, suitably up to about 200:1 and preferably up to about 150:1.

Alternatively, the silica sol of the invention may be free or essentially free from aluminum, and the silica sol may contain silica particles which are not modified with aluminum. This means that aluminum may be present in the sol as an impurity, in the continuous, or aqueous, phase of the sol and/or in the silica particles, and then the silica sol usually has a molar ratio of Si:Al of at least about 400:1 or at least about 500:1, suitably at least about 600:1, depending on the properties of the starting material used to prepare the silica sol.

The silica particles of the sol usually have a specific surface area of at least about 300 $m^2/g$ or at least about 500 $m^2/g$, suitably at least about 600 $m^2/g$ and preferably at least about 750 $m^2/g$. The specific surface area is usually up to about 1500 $m^2/g$ or at least about 1300 $m^2/g$, suitably up to about 1100 $m^2/g$. The specific surface area is measured by means of titration with NaOH as described by G. W. Sears, Jr. in Analytical Chemistry 28(1956):12, 1981-1983, after appropriate removal of or adjustment for any compounds present in the sample that may disturb the titration like aluminum and boron compounds, for example as described by Sears and in U.S. Pat. No. 5,176,891. The specific surface areas given herein represent the average specific surface area of the silica particles present in the sol.

The silica sol of the invention usually has a silica ($SiO_2$) content of at least about 2% by weight or at least 3% by weight, suitably at least about 5% by weight or at least about 8% by weight and preferably at least about 10% by weight. Usually, the silica content is up to about 30% by weight or up to about 20% by weight and suitably up to about 15% by weight. In order to simplify shipping and reduce transportation costs, it is generally preferable to ship a high concentration silica sol of the invention but it is also possible to dilute and mix the silica sol with water to a substantially lower silica content prior to use, e.g. a silica content of from about 0.05 to about 2% by weight or from about 0.1 to 1.5% by weight. Dilution and mixing with water prior to use in a process for producing paper and board may result in good mixing with the furnish components of the cellulosic suspension. One advantage associated with the silica sol of the invention is that it is less sensitive towards dilution with water, in particular water containing a substantial amount of calcium, which is commonly used in the papermaking industry, and hereby the present silica sol shows improved stability towards precipitation, also during prolonged storage at elevated temperatures, which may lead to aggregation and gelation.

Another advantage associated the present silica sol is that it may be added as is, or at a high silica content, to the cellulosic suspension, i.e. without dilution and mixing with water, and still results in good or improved mixing with the furnish components of the cellulosic suspension.

The viscosity of the silica sol of the invention can vary depending on, for example, the silica content of the sol. The viscosity is often at least about 2 cP, or at least about 3 cP, suitably at least 3.5 cP. Usually, the viscosity is up to about 15 cP or up to about 10 cP, suitably up to about 8.0 cP. The viscosity can be measured by means of known technique, e.g. using a Brookfield Viscometer LVDV-II+Pro, ULA (00) spindle.

According to the invention, the silica sol can be produced using an alkali metal silicate as a starting material by a process comprising acidification, alkalization, particle formation, particle growth, particle aggregation and microgel formation, optional aluminum modification and optional concentration. Preferably, the starting material is an aqueous solution of alkali metal silicate, or water glass. Examples of suitable alkali metal silicates include lithium, sodium, potassium silicates and mixtures thereof, preferably sodium silicate. The alkali metal silicate usually has a molar ratio of $SiO_2:M_2O$, in which M is alkali metal, of from about 1:1 to about 15:1, suitably from about 1.5:1 to about 4.5:1, preferably from about 2.5:1 to about 4.0:1. The aqueous alkali metal silicate used usually has a $SiO_2$ content of from about 1 to about 35% by weight, suitably from about 3 to about 30% by weight. The aqueous alkali metal silicate solution usually has a pH above about 12, typically above about 13.

In the process, the aqueous alkali metal silicate solution is subjected to acidification. During the acidification, silica particle formation and growth preferably take place. The acidification can be carried out by addition of a mineral acid, e.g. sulfuric acid, hydrochloric acid and phosphoric acid, and/or by means of other chemicals known for acidification, e.g. ammonium sulfate and carbon dioxide. Preferably, the acidification is carried out by means of an acid cation exchanger. The acidification is preferably carried out by means of a strongly acid cation exchange resin, e.g. a cation exchange resin of sulfonic acid type. Usually the acidification of the aqueous alkali metal silicate solution is carried out to provide an acidified aqueous solution, or acid sol, having a pH of from about 1.0 to about 4.0, suitably from about 2.0 to about 4.0 and preferably from about 2.2 to about 3.0.

The acid sol may be subjected to further particle growth and/or particle aggregation, or agglomeration. This can be achieved by storage at room temperature during somewhat longer periods of time, e.g. for a day or up to about 3 to about 4 days, or by heat treatment in which the period of time and temperature can be adjusted so that a shorter period of time is used at a higher temperature. It is possible to use a fairly high temperature during a very short period of time, and it is also possible to use a lower temperature during a somewhat longer period of time. In the heat treatment, the acidified sol can be heated at a temperature of at least about 25° C., suitably from about 30° C. to about 95° C. and preferably from about 35° C. to about 80° C. The heat treatment in usually carried out for at least about 10 minutes, suitably from about 15 to about 600 minutes or from about 20 to about 240 minutes.

The acid sol is subjected to alkalization, which can be carried out using conventional alkali, e.g. sodium, potassium and ammonium hydroxide and alkali metal silicate, preferably an aqueous alkali metal silicate solution or water glass of the starting material as defined above, including its alkali metal, molar ratio, silica content and pH value. The alkalization is suitably carried out to a pH of at least about 10, usually at least about 10.5, and the alkalization is usually carried out to a pH of up to about 11.5. The alkalization is further usually carried out to a final molar ratio of $SiO_2$:$M_2O$, in which M is alkali metal, of at least about 6:1, suitably from at least about 8:1 and preferably at least about 10:1, and it can be up to 16:1, suitably up to about 15:1 or up to about 14:1.

Particle aggregation and microgel formation can be achieved in several ways. The degree of aggregate and microgel formation may be affected by the salt and silica contents during the acidification and alkalization steps, and the time period and frequency during which the alkali metal silicate solution and/or acid sol are passed through a stability minimum at a pH in the range of from about 5 to about 8. By keeping the alkali metal silicate solution and acid sol under vigorous stirring during the steps of acidification and alkalization, respectively, at the pH range of from 5 to about 8, usually from about 6 to about 8, for a prolonged period of time, usually from 1 to 1200 seconds, or from 10 to 600 seconds, the desired degree of aggregate and microgel formation can be obtained, corresponding to an S-value of the final silica sol as defined above. Suitably, the particle aggregation and microgel formation is obtained during the alkalization step at the pH and time period defined above.

Preferably, the acid sol is alkalized by addition of aqueous alkali metal silicate solution to obtain an intermediate sol and then the addition of aqueous alkali metal silicate solution is stopped when the intermediate sol has reached a pH of from about 5 to about 8, preferably a pH from about 6 to about 8. Subsequently, the intermediate sol is stirred for a time period of at least about 10 seconds, suitably at least about 60 seconds and preferably at least about 300 seconds, and it can be stirred for a time period of up to about 6000 seconds, suitably up to about 5000 seconds and preferably up to about 1200 seconds without addition of aqueous alkali metal silicate solution, preferably from about 300 to about 1200 seconds, whereupon the intermediate sol is further alkalized by addition of aqueous alkali metal silicate solution to obtain a silica sol having a pH above about 10 and molar ratio of $SiO_2$:$M_2O$, in which M is alkali metal, of from about 6:1 to about 16:1, preferably the pH is from about 10.5 to about 11.5 and the molar ratio of $SiO_2$:$M_2O$ is from about 10:1 to about 14:1, and preferably M is sodium.

The silica sol may comprise aluminum and it may be modified with aluminum. Aluminum modification can be achieved by adding an aluminum compound to the acid sol, intermediate sol or alkalized sol, i.e. silica sol, for example to the sol being alkalized, i.e. during alkalization, whereby the aluminum compound can be added together with the aqueous alkali metal silicate solution as defined above. Examples of suitable aluminum compounds include alkaline aluminum salts, e.g. aluminates, suitably an aqueous aluminate, e.g. sodium aluminate, potassium aluminate and mixtures thereof, preferably sodium aluminate. When using an aluminium compound, it is preferably added in an amount to provide the molar ratio of Si:Al as defined above.

If desired, the silica sol obtained after alkalization can be subjected to concentration. This can be carried out in known manner, e.g. by osmotic methods, evaporation and ultrafiltration. Concentration of the silica sol can be made after it has been partly of fully alkalized.

The obtained silica sol can be diluted with water to lower the silica content to a desired value. Dilution with water usually takes place to silica contents within the range of from about 0.05 to about 2% by weight or from about 0.1 to 1.5% by weight. Dilution with purified water usually increases the stability of the silica sol.

The silica sol of the invention is suitable for use as a flocculating agent, for example in the production of pulp, paper and board, preferably as a drainage and retention aid, and in water purification, both for purification of different kinds of waste water and for purification of white water from the pulp and paper industry. The silica sols can be used as a flocculating agent, preferably as a drainage and retention aid, in combination with one or more organic polymers which can be selected from anionic, amphoteric, non-ionic and cationic polymers and mixtures thereof. The use of such polymers as flocculating agents and as drainage and retention aids is well known in the art.

The polymer can be obtained from natural or synthetic sources, and they can be linear, branched or cross-linked. Examples of generally suitable organic polymers include anionic, amphoteric and cationic starches; anionic, amphoteric and cationic acrylamide-based polymers, including essentially linear, branched and cross-linked anionic and cationic acryl-amide-based polymers; as well as cationic poly(diallyldimethyl ammonium chloride); cationic polyethylene imines; cationic polyamines; cationic polyamideamines and vinylamide-based polymers, melamine-formaldehyde and urea-formaldehyde resins. Suitably, the silica sol is used in combination with at least one cationic or amphoteric polymer, preferably cationic starch and cationic polyacrylamide, which can be used singly, together with each other or together with other polymers, e.g. other cationic and/or anionic polymers, suitably anionic polyacrylamide. The weight average molecular weight of the polymer is suitably above about 1,000,000 and preferably above about 2,000,000. The upper limit of the weight average molecular weight of the polymer is not critical; it can be about 50,000,000, usually about 30,000,000 and suitably about 25,000,000. However, the weight average molecular weight of polymers obtained from natural sources may be higher.

The silica sol of the invention can also be used in combination with one or more coagulants, either with or without the co-use of the organic polymer(s) described above. Examples of suitable coagulants include organic coagulants, e.g. water-soluble organic polymeric coagulants, and inorganic coagulants. The coagulants can be used singly or together, i.e. a polymeric coagulant can be used in combination with an inorganic coagulant. The coagulants are preferably cationic. Examples of suitable water-soluble organic polymeric cationic coagulants include cationic polyamines, polyamideamines, polyethylene imines, dicyandiamide condensation polymers and polymers of water soluble ethylenically unsaturated monomer or monomer blend which is formed of about 50 to 100 mole % of cationic monomer and 0 to about 50 mole % of other monomer. The amount of cationic monomer is usually at least about 80 mole %, suitably 100 mole %. Examples of suitable ethylenically unsaturated cationic monomers include dialkylaminoalkyl (meth)-acrylates and -acrylamides, preferably in quaternised form, and diallyl dialkyl ammonium chlorides, e.g. diallyl dimethyl ammonium chloride (DADMAC), preferably homopolymers and copolymers of DADMAC. The organic polymeric cationic coagulants usually have a weight average molecular weight in the range of from 1,000 to 700,000, suitably from 10,000 to 500,000. Examples of suitable inorganic coagulants include aluminum compounds, e.g. alum and polyaluminum compounds, e.g. polyaluminum chlorides, polyaluminum sulphates, polyaluminum silicate sulphates and mixtures thereof, preferably alum and polyaluminum chloride.

Suitable drainage and retention aids for use according to the invention include various combinations of the present silica sol and one or more organic polymers, and optional aluminum compounds. Examples of preferred drainage and retention aids for use in the process of the invention comprise (i) silica sol of the invention and cationic starch, (ii) silica sol of the invention, cationic starch and aluminum compound, preferably alum and polyaluminium chloride, (iii) silica sol of the invention and cationic polyacrylamide, (iv) silica sol of the invention, cationic polyacrylamide and aluminum compound, preferably alum and polyaluminium chloride, (v) silica sol of the invention, cationic starch and cationic polyacrylamide, (vi) silica sol of the invention, cationic starch, cationic polyacrylamide and aluminum compound, preferably alum and polyaluminium chloride, (vii) silica sol of the invention, cationic polyacrylamide and anionic polyacrylamide, (viii) silica sol of the invention, cationic starch and anionic polyacrylamide, and (ix) silica sol of the invention, cationic starch, anionic polyacrylamide and aluminum compound, preferably alum and polyaluminium chloride.

The one or more drainage and retention aids according to the invention can be added to the aqueous cellulosic suspension, or stock, in conventional manner, and in any order. When using drainage and retention aids comprising silica sol and organic polymer, it is preferred to add the organic polymer to the stock before adding the silica sol, or to add them simultaneously, even if the opposite order of addition may be used. In one embodiment, the organic polymer is added before a shear stage, which can be selected from pumping, mixing and cleaning stages, and the silica sol is added after that shear stage. In another embodiment, the silica sol and organic polymer are both added late in the process, e.g. after the last stage of high shear, which can be selected from pumping, mixing and cleaning stages, preferably after the centri screen.

When using drainage and retention aids comprising a silica sol and anionic and cationic organic polymers, it is preferred to add the cationic organic polymer to the cellulosic suspension before adding the silica sol and anionic organic polymer. When using a coagulant, it is preferably added to the cellulosic suspension before adding the silica sol.

The one or more drainage and retention aids according to the invention are added to the stock to be dewatered in amounts which can vary within wide limits depending on, inter alia, type and number of drainage and retention aids, type of furnish, filler content, type of filler, point of addition, etc. Generally the components are added in amounts that give better drainage and retention than is obtained when not adding the components. The silica sol is usually added in an amount of at least about 0.001% by weight, often at least about 0.005% by weight, calculated as $SiO_2$ and based on dry furnish, i.e. dry cellulosic fibers and optional filler, and the upper limit is usually about 1.0% by weight and suitably about 0.5% by weight. Each of the organic polymers is usually added in an amount of at least about 0.001% by weight, often at least about 0.005% by weight, based on dry furnish, and the upper limit is usually about 3% by weight and suitably about 1.5% by weight. When using a cationic polymeric coagulant, it can be added in an amount of at least about 0.05% by weight, based on dry furnish. Suitably, the amount is in the range of from about 0.07 to about 0.5% by weight, preferably in the range from about 0.1 to about 0.35% by weight. When using an aluminum compound as the inorganic coagulant, it can be added in an amount of at least about 0.005% by weight, calculated as $Al_2O_3$ and based on dry furnish. Suitably the amount is in the range of from about 0.01 to about 3.0% by weight, preferably in the range from about 0.05 to about 2.0% by weight.

Further additives which are conventional in the production of paper and board can of course be used in combination with the silica sol of the invention, such as, for example, dry strength agents, wet strength agents, optical brightening agents, dyes, sizing agents like rosin-based sizing agents and cellulose-reactive sizing agents, e.g. alkyl and alkenyl ketene dimers and ketene multimers, alkyl and alkenyl succinic anhydrides, etc. The cellulosic suspension can also contain mineral filler, e.g. kaolin, china clay, titanium dioxide, gypsum, talc and natural and synthetic calcium carbonates such as chalk, ground marble and precipitated calcium carbonate.

The term "paper and board", as used herein, means all types of cellulosic sheet or web-like products. The process can be used in the production of paper and board from different types of suspensions of cellulosic, or cellulose-containing, fibers and the suspensions suitably contains at least about 25% by weight and preferably at least about 50% by weight of such fibers, based on dry substance. The suspension can be made from cellulosic fibers from chemical pulp, e.g. sulphate, sulphite and organosolv pulps, mechanical pulp, e.g. thermomechanical pulp, chemo-thermomechanical pulp, refiner pulp and groundwood pulp, from both hardwood and softwood, and can also be based on recycled fibers, optionally from de-inked pulps, and mixtures thereof, preferably the suspension is made from pulp comprising chemical pulp, recycled fiber pulp and mixtures thereof. Examples of suitable paper and board grades obtained by the invention include fine paper, test liner, white top liner and craft liner.

The process of this invention is particularly useful in the production of paper and board from cellulosic suspensions having relatively low conductivity and/or cationic demand. In this case, the conductivity of the cellulosic suspension that is dewatered on the wire is usually at least about 0.5 mS/cm, suitably at least 0.75 mS/cm, and it is usually up to about 5.0 mS/cm, suitably up to about 4.0 mS/cm. Conductivity can be measured by standard equipment, e.g. a WTW LF 539 instrument supplied by Christian Berner. Further, in this case, the cationic demand of the cellulosic suspension to which the one or more drainage and retention aids comprising the silica sol are added is usually below about 0.75 mEq./l, or below about 0.5 mEq./l. Cationic demand can be measured by a Mütek Particle Charge Detector supplied by BTG.

The pH of the cellulosic suspension can be from about 3 to about 10, suitably at least about 3.5 and preferably from about 4 to about 9.

EXAMPLES

The invention is further illustrated in the following examples which, however, are not intended to limit the same. Parts and % relate to parts by weight and % by weight, respectively, and all suspensions are aqueous, unless otherwise stated.

Example 1

This example illustrates the preparation of a silica sol according to the invention:

Aqueous sodium silicate solution with a molar ratio of $SiO_2:Na_2O$ of 3.5:1 and $SiO_2$ content of 5.0% by weight was ion exchanged to form an acid silica sol by pumping it through a column filled with cation ion exchange resin Amberlite IR-120 (available from Rohm & Haas) which had been regenerated with sulphuric acid according to manufacturer's instruction.

To 3000 g of the obtained acid sol with a $SiO_2$ content of 5.0% by weight was added aqueous sodium silicate solution with a molar ratio of $SiO_2:M_2O$ of about 3.4:1 and $SiO_2$ content of 5.0% by weight under stirring until the mixture obtained reached a pH of 7.7 whereupon the addition of aqueous sodium silicate solution was temporarily stopped for a time period of 1974 seconds, and then the addition of aqueous sodium silicate solution was recommenced until an alkalized sol having a pH of 9.8 and molar ratio of $SiO_2:Na_2O$ of 20:1 had been formed.

The alkalized sol was concentrated by ultrafiltration to a $SiO_2$ content of 12.2% by weight and then further aqueous sodium silicate solution having a molar ratio of $SiO_2:M_2O$ of 3.4:1 and $SiO_2$ content of 24.2% by weight was added to form a fully alkalized silica sol having molar ratio of $SiO_2:M_2O$ of about 12. Deionized water was then added to achieve a final $SiO_2$ content of about 12% by weight.

The obtained sol of silica particles, designated Ex. 1, had a $SiO_2$ content of 12.1% by weight, pH of 11.0, mole ratio $SiO_2:Na_2O$ of 12.5, concentration of soluble silica of 5200 mg $SiO_2/l$, S-value of 35% and contained silica particles with a specific surface area of 870 $m^2/g$.

Example 2

This example illustrates the preparation of another silica sol according to the invention:

The procedure of Example 1 was repeated except that the aqueous sodium silicate solution was added to the acid sol under stirring until the mixture obtained reached a pH of 7.6 whereupon the addition of aqueous sodium silicate solution was temporarily stopped for a time period of 4920 seconds, and then the addition of aqueous sodium silicate solution was recommenced.

The obtained sol of silica particles, designated Ex. 2, had a $SiO_2$ content of 12.1% by weight, pH of 11.0, mole ratio $SiO_2:Na_2O$ of 12.5, concentration of soluble silica of 5400 mg $SiO_2/l$, S-value of 33% and contained silica particles with a specific surface area of 870 $m^2/g$.

Example 3

This example illustrates the preparation of a silica sol according to the invention:

Sodium silicate solution with a molar ratio of $SiO_2:M_2O$ of 3.4:1 and $SiO_2$ content of 5.5% was ion exchanged to form an acid silica sol by pumping it through a column filled with strong acid cation exchange resin Lewatit MDS1368 which had been regenerated with hydrochloric acid according to manufacturer's instruction.

To 2000 g of the obtained acid sol with a $SiO_2$ content of 5.0% was added aqueous sodium silicate solution with a molar ratio of $SiO_2:M_2O$ of 3.4:1 and $SiO_2$ content of 5.0% under stirring until the mixture obtained reached a pH of 7.5 whereupon the addition of sodium silicate solution was temporarily stopped for a time period of 3290 seconds, and then the addition of sodium silicate solution was recommenced until an alkalized sol having a pH of 9.6 had been formed.

The alkalized sol was concentrated by ultrafiltration to a $SiO_2$ content of 12%. Sodium silicate solution having a molar ratio of $SiO_2:M_2O$ of 3.4:1 and $SiO_2$ content of 25.2% was diluted with deionized water and added under stirring to form a fully alkalized silica sol having molar ratio of $SiO_2:M_2O$ of about 12:1.

The obtained sol of silica particles, designated Ex. 3, had a $SiO_2$ content of 11.5%, pH of 11.0, molar ratio $SiO_2:Na_2O$ of 12:1, concentration of soluble silica of 3700 mg $SiO_2/l$, S-value of 36% and contained silica particles with a specific surface area of 910 $m^2/g$.

Example 4

This example illustrates the preparation of a silica sol according to the invention:

The procedure of Example 3 was repeated except that the sodium silicate solution was added to the acid sol under stirring until the mixture obtained reached a pH of 6.8 whereupon the addition of sodium silicate solution was temporarily stopped for a time period of 340 seconds, and then the addition of sodium silicate solution was recommenced.

The obtained sol of silica particles, designated Ex. 4, had a $SiO_2$ content of 11.8%, pH of 11.0, molar ratio $SiO_2:Na_2O$ of 12:1, concentration of soluble silica of 3300 mg $SiO_2/l$, S-value of 35% and contained silica particles with a specific surface area of 910 $m^2/g$.

Example 5

This example illustrates the preparation of a silica sol according to the invention:

An acid silica sol was produced according to the procedure of Example 3. To 2000 g of the acid sol with a $SiO_2$ content of 5.21% was added 70 g of aqueous sodium silicate solution with a molar ratio of $SiO_2:Na_2O$ of 3.4:1 and $SiO_2$ content of 5.0% under stirring whereupon the addition of sodium silicate solution was temporarily stopped for a time period of 310 seconds, and then the addition of another 351 g of the sodium silicate solution was recommenced until an alkalized sol having a pH of 9.6 had been formed. To the alkalized sol was added 43.9 g of sodium aluminate solution with $Al_2O_3$ content of 2.43% and $Na_2O$ content of 1.84% under stirring to form an aluminized sol.

The aluminized sol was concentrated by ultrafiltration to a $SiO_2$ content of 13.1%. To 798 g of the obtained sol was added 56.5 g of sodium silicate solution having molar ratio of $SiO_2:Na_2O$ of 3.4 and $SiO_2$ content of 25.2% and under stirring to form an alkalized silica sol.

The obtained sol of silica particles, designated Ex. 5, had a $SiO_2$ content of 12.5%, pH of 10.9, molar ratio $SiO_2:Na_2O$ of 11.8:1, molar ratio Si:Al of 76:1, concentration of soluble silica of 5900 mg $SiO_2/l$, S-value of 28% and contained silica particles with a specific surface area of 930 $m^2/g$.

Example 6

This example illustrates the preparation of a silica sol according to the invention:

The procedure of Example 1 was repeated except that small modifications were made to the pH and time period for the temporary stop of addition of aqueous sodium silicate solution in the alkalization step, and to the further addition of aqueous sodium silicate solution and water to the alkalized silica sol.

The obtained sol of silica particles, designated Ex. 6, had a $SiO_2$ content of 12.2%, pH of 11.0, molar ratio $SiO_2:Na_2O$ of 12.6:1, concentration of soluble silica of 4900 mg $SiO_2/l$, S-value of 38% and contained silica particles with a specific surface area of 920 $m^2/g$.

Example 7

This example illustrates the preparation of a prior art silica sol used for comparison:

The procedure of Example 1 was repeated except that the aqueous sodium silicate solution was continuously added to the acid sol under stirring, i.e. without any temporary stop of addition in the pH range of from 5 to 8, until an alkalized sol having a pH of 9.9 and molar ratio $SiO_2:Na_2O$ of 20:1 had been formed.

The obtained sol of silica particles, designated Ref. 1, had a $SiO_2$ content of 11.0% by weight, pH of 11.1, mole ratio $SiO_2:Na_2O$ of 11.7, concentration of soluble silica of 6900 mg $SiO_2/l$, S-value of 47% and contained silica particles with a specific surface area of 900 $m^2/g$.

Example 8

A silica sol was prepared according to the general disclosure of U.S. Pat. No. 5,368,833. The obtained sol of silica particles, designated Ref. 2, had a $SiO_2$ content of 7.7% by weight, pH of 9.6, mole ratio $SiO_2:Na_2O$ of 31, mole ratio Si:Al of 44, concentration of soluble silica of 1800 mg $SiO_2/l$, S-value of 29% and contained silica particles with a specific surface area of 750 $m^2/g$.

Example 9

A silica sol was prepared according to the general disclosure of WO 00/66491. The obtained silica sol, designated Ref. 3, had a $SiO_2$ content of 14.8% by weight, pH of 10.8, molar ratio $SiO_2:Na_2O$ of 20:1, concentration of soluble silica of 2100 mg $SiO_2/l$, and S-value of 36%, and contained silica particles with a specific surface area of 740 $m^2/g$.

Example 10

A silica sol was prepared according to the procedure of Example 4 of WO 00/66491. The obtained sol of silica particles, designated Ref. 4, had a concentration of soluble silica of 1700 mg $SiO_2/l$.

Example 11

A silica sol was prepared according to the procedure of Example 1 of US 2005/228057 A1. The obtained sol of silica particles, designated Ref. 5, had a molar ratio Si:Al of 26.2:1, and concentration of soluble silica of 1700 mg $SiO_2/l$.

Example 12

A silica sol was prepared according to the procedure of Example 4 of US 2005/228057 A1. The obtained sol of silica particles, designated Ref. 6, had a molar ratio Si:Al of 30.2:1, concentration of soluble silica of 2600 mg $SiO_2/l$.

Example 13

A silica sol was prepared according to the general disclosure of WO 2008/150230. The obtained sol of silica particles, designated Ref. 7, had a $SiO_2$ content of 6.4%, pH of 8.3, molar ratio $SiO_2:Na_2O$ of 16.9:1, molar ratio Si:Al of 8.5:1, concentration of soluble silica of 2700 mg $SiO_2/l$, S-value of 12% and contained silica particles with a specific surface area of 1060 $m^2/g$.

Example 14

Retention performance was evaluated by means of a Britt Dynamic Drainage Jar. The cellulosic suspension used was based on a blend of 30% by weight bleached birch sulphate, 30% by weight bleached pine sulphate and 40% by weight ground calcium carbonate. Stock volume was 500 ml, consistency 0.45% and pH about 8.4. Conductivity of the stock was adjusted to 1.48 mS/cm by addition of 0.1 g/l calcium chloride and 1.8 g/l sodium sulphate.

In the tests, silica sols ($SiO_2$) were used in conjunction with a polyaluminium chloride (PAC), cationic starch (CS) having a degree of cationic substitution of 0.042, cationic polyacrylamide (CPAM) being a copolymer of acrylamide (90 mole %) and dimethylaminoethyl acrylate methyl chloride quaternary salt (DMAEA-MCQ) (10 mole %) and having a weight average molecular weight of about 10 million Dalton.

The cellulosic suspension was stirred in a baffled jar at a constant speed of 1200 rpm throughout the test and chemical additions were conducted as follows:
   adding PAC to the cellulosic suspension 40 seconds prior to dewatering, adding CS to the cellulosic suspension 35 seconds prior to dewatering, adding CPAM to the cellulosic suspension 20 seconds prior to dewatering, adding $SiO_2$ to the cellulosic suspension 10 seconds prior to dewatering, and dewatering the cellulosic suspension and then measuring the turbidity of the filtrate diluted 15 times with deionized water.

The retention performance of the silica sols is shown in Table 1, in which addition levels are calculated as dry product on dry furnish:

TABLE 1

| Test | PAC | CS | CPAM | SiO₂ | | Turbidity |
|---|---|---|---|---|---|---|
| No. | [kg/t] | [kg/t] | [kg/t] | [type] | [kg/t] | [NTU] |
| 1 | — | — | — | — | — | 319 |
| 2 | 1 | 8 | 0.3 | — | — | 139 |
| 3 | 1 | 8 | 0.3 | Ex. 1 | 0.6 | 90 |
| 4 | 1 | 8 | 0.3 | Ref. 1 | 0.6 | 105 |
| 5 | 1 | 8 | 0.3 | Ref. 2 | 0.6 | 113 |
| 6 | 1 | 8 | 0.3 | Ref. 3 | 0.6 | 101 |

As is evident from Table 1, the silica sol according to the invention, Ex. 1, showed significantly better retention performance over the silica sols used for comparison, Ref. 1, Ref. 2, and Ref. 3.

Example 15

Drainage performance was evaluated by means of a Dynamic Drainage Analyser (DDA), available from Pulp-Eye AB, Sweden, which measures the time for draining a set volume of stock. The stock was stirred in a baffled jar at a speed of 1500 rpm throughout the test while additions of chemicals were made. A stock volume of 800 ml was drained through a wire when removing a plug and applying vacuum to that side of the wire opposite to the side on which the stock is present. Drainage performance is reported as the dewatering time (s).

The stock used in this Example was based on a furnish containing 60% chemical pulp, which consisted of 80% hardwood and 20% softwood, and 40% filler, precipitated calcium carbonate (PCC). Salts were added to increase the conductivity to about 1.5 mS/cm, pH was about 8.4 and the pulp consistency was about 5.4 g/l.

In the tests, the chemical additives of Example 14 were used except that no CPAM was used. The cellulosic suspension was stirred in the baffled jar and chemical additions were made as follows:

adding PAC to the cellulosic suspension 43 seconds prior to dewatering, adding CS to the cellulosic suspension 35 seconds prior to dewatering, adding $SiO_2$ to the cellulosic suspension 10 seconds prior to dewatering, and dewatering the cellulosic suspension while automatically recording the dewatering time.

Table 2 shows the drainage performance of the silica sols, in which the addition levels are calculated as dry product on dry furnish:

TABLE 2

| Test | PAC | CS | SiO₂ | | Dewatering |
|---|---|---|---|---|---|
| No. | [kg/t] | [kg/t] | [type] | [kg/t] | [seconds] |
| 1 | 0.13 | 7 | — | — | 21.8 |
| 2 | 0.13 | 7 | Ex. 3 | 0.15 | 16.4 |
| 3 | 0.13 | 7 | Ex. 3 | 0.3 | 12.5 |
| 4 | 0.13 | 7 | Ex. 3 | 0.6 | 8.7 |
| 5 | 0.13 | 7 | Ex. 3 | 1.0 | 6.8 |
| 6 | 0.13 | 7 | Ex. 4 | 0.15 | 16.4 |
| 7 | 0.13 | 7 | Ex. 4 | 0.3 | 12.4 |
| 8 | 0.13 | 7 | Ex. 4 | 0.6 | 8.6 |
| 9 | 0.13 | 7 | Ex. 4 | 1.0 | 6.7 |
| 10 | 0.13 | 7 | Ref. 4 | 0.15 | 18.6 |
| 11 | 0.13 | 7 | Ref. 4 | 0.3 | 15.7 |
| 12 | 0.13 | 7 | Ref. 4 | 0.6 | 11.6 |
| 13 | 0.13 | 7 | Ref. 4 | 1.0 | 8.7 |
| 14 | 0.13 | 7 | Ref. 5 | 0.15 | 17.9 |
| 15 | 0.13 | 7 | Ref. 5 | 0.3 | 13.7 |
| 16 | 0.13 | 7 | Ref. 5 | 0.6 | 9.6 |
| 17 | 0.13 | 7 | Ref. 5 | 1.0 | 7.5 |
| 18 | 0.13 | 7 | Ref. 6 | 0.15 | 17.5 |
| 19 | 0.13 | 7 | Ref. 6 | 0.3 | 13.4 |
| 20 | 0.13 | 7 | Ref. 6 | 0.6 | 9.1 |
| 21 | 0.13 | 7 | Ref. 6 | 1.0 | 7.2 |

As is evident from Table 2, the silica sols according to the invention, Ex. 3 and Ex. 4, showed significantly better drainage performance over the silica sols used for comparison, Ref. 4, Ref. 5, and Ref. 6.

Example 16

Drainage performance was evaluated according to the procedure of Example 15 using different silica sols. The stock used in this Example was based on a furnish containing about 60% chemical pulp, which consisted of about 80% hardwood and about 20% softwood, and about 40% filler, precipitated calcium carbonate (PCC). Salts were added to increase the conductivity to about 1.5 mS/cm, pH was about 8.3 and the pulp consistency was about 5.4 g/l.

Table 3 shows the drainage performance of the silica sols, in which the addition levels are calculated as dry product on dry furnish:

TABLE 3

| Test | PAC | CS | SiO₂ | | Dewatering |
|---|---|---|---|---|---|
| No. | [kg/t] | [kg/t] | [type] | [kg/t] | [seconds] |
| 1 | 0.13 | 7 | — | — | 24.3 |
| 2 | 0.13 | 7 | Ex. 5 | 0.3 | 14.7 |
| 3 | 0.13 | 7 | Ex. 5 | 0.6 | 10.0 |
| 4 | 0.13 | 7 | Ex. 5 | 0.9 | 8.0 |
| 5 | 0.13 | 7 | Ex. 6 | 0.3 | 15.7 |
| 6 | 0.13 | 7 | Ex. 6 | 0.6 | 10.7 |
| 7 | 0.13 | 7 | Ex. 6 | 0.9 | 8.6 |
| 8 | 0.13 | 7 | Ref. 5 | 0.3 | 18.4 |
| 9 | 0.13 | 7 | Ref. 5 | 0.6 | 14.1 |
| 10 | 0.13 | 7 | Ref. 5 | 0.9 | 11.1 |
| 11 | 0.13 | 7 | Ref. 6 | 0.3 | 17.2 |
| 12 | 0.13 | 7 | Ref. 6 | 0.6 | 12.0 |
| 13 | 0.13 | 7 | Ref. 6 | 0.9 | 9.5 |
| 14 | 0.13 | 7 | Ref. 7 | 0.3 | 16.6 |
| 15 | 0.13 | 7 | Ref. 7 | 0.6 | 12.0 |
| 16 | 0.13 | 7 | Ref. 7 | 0.9 | 10.0 |

As is evident from Table 3, the silica sol containing aluminium-modified silica particles according to the invention, Ex. 5, showed better drainage performance over the silica sols containing aluminium-modified silica particles used for comparison, Ref. 5, Ref. 6 and Ref. 7. Also the silica sol Ex. 6 according to the invention showed better drainage performance over the silica sols used for comparison.

The invention claimed is:

1. A process for producing a silica sol, the process comprising,
    (a) acidifying an aqueous alkali metal silicate solution to a pH of from 1 to 4 to form an acid sol,
    (b) alkalizing the acid sol by addition of aqueous alkali metal silicate solution to obtain an intermediate sol and interrupt the addition of aqueous alkali metal silicate solution when the intermediate sol has reached a pH of from about 5 to about 8,
    (c) stirring the intermediate sol for a time period of from about 10 to about 6000 seconds without addition of aqueous alkali metal silicate solution, and
    (d) alkalizing the intermediate sol by addition of aqueous alkali metal silicate solution to obtain a silica sol having a pH above about 10 and molar ratio of $SiO_2:M_2O$, in which M is alkali metal, of from about 6:1 to about 16:1,
    (e) optionally adding an aluminum compound to the acid sol, intermediate sol or silica sol.

2. The process according to claim 1, wherein the process comprises adding an aluminum compound to the acid sol, intermediate sol or silica sol.

3. The process according to claim 1, wherein the aluminum compound is added in an amount to obtain a silica sol having a molar ratio of Si:Al of from about 25:1 to about 250:1.

4. The process according to claim 1, wherein the silica sol has a concentration of soluble silica above about 3000 mg $SiO_2/l$.

5. The process according to claim 4, wherein the silica sol has an S-value of from about 18 to about 40%.

6. The process according to claim 1, wherein the silica sol has an S-value of from about 18 to about 40%.

7. The process according to claim 1, wherein the sol contains silica particles having a specific surface area of at least about 500 $m^2/g$.

8. The process according to claim 1, wherein the silica sol has a silica content of from about 3 to about 20% by weight.

9. The process according to claim 1, wherein the silica sol has a pH of from about 10.5 to about 11.5.

10. The process according to claim 1, wherein the silica sol has a molar ratio of $SiO_2:M_2O$, in which M is alkali metal, of from about 8:1 to about 15:1.

11. The process according to claim 1, wherein the silica sol has a concentration of soluble silica of at least about 3500 mg $SiO_2/l$.

12. The process according to claim 1, wherein the silica sol has a conductivity of at least about 4.0 mS/cm.

13. A method of flocculation, comprising performing the process of claim 1, and providing the silica sol so obtained as a flocculating agent.

14. The process according to claim 13, wherein the silica sol has an S-value of at least 20%.

15. A process for producing paper and board comprising,
    (i) preparing a silica sol according to the process of claim 1;
    (ii) adding one or more drainage and retention aids to an aqueous suspension comprising cellulosic fibers in which one of the drainage and retention aids is the silica sol from (i); and
    (iii) dewatering the obtained suspension to provide a sheet or web of paper board.

16. The process according to claim 15, wherein said one or more drainage and retention aids comprise a cationic polymer.

17. The process according to claim 15, wherein said one or more drainage and retention aids comprise an anionic polymer.

18. The process according to claim 15, further comprising adding to the suspension an aluminum compound.

* * * * *